US008868257B2

(12) United States Patent
Kirchhofer et al.

(10) Patent No.: US 8,868,257 B2
(45) Date of Patent: Oct. 21, 2014

(54) DEVICE AND A METHOD FOR CONSTRUCTING A FLIGHT PATH IN ORDER TO REACH A DESTINATION

(75) Inventors: Alain Kirchhofer, Salon de Provence (FR); Patrick Garcia, Marseilles (FR); Francois Mandonnaud, Carry le Rouet (FR)

(73) Assignee: Airbus Helicopters, Marignane Cedex (FR)

( * ) Notice: Subject to any disclaimer, the term of this patent is extended or adjusted under 35 U.S.C. 154(b) by 98 days.

(21) Appl. No.: 13/472,896

(22) Filed: May 16, 2012

(65) Prior Publication Data

US 2012/0296499 A1 Nov. 22, 2012

(30) Foreign Application Priority Data

May 20, 2011 (FR) ...................................... 11 01562

(51) Int. Cl.
*G01C 23/00* (2006.01)
(52) U.S. Cl.
CPC ...................................... *G01C 23/00* (2013.01)
USPC ................................ 701/3; 340/990; 702/144
(58) Field of Classification Search
USPC ................. 701/3, 5, 301, 400, 448, 449, 446; 340/990, 995, 988; 702/144, 145
See application file for complete search history.

(56) References Cited

U.S. PATENT DOCUMENTS

| | | | | |
|---|---|---|---|---|
| 6,088,654 A | * | 7/2000 | Lepere et al. | 701/301 |
| 6,198,991 B1 | * | 3/2001 | Yamakawa et al. | 701/16 |
| 7,383,104 B2 | * | 6/2008 | Ishii et al. | 701/3 |
| 7,558,652 B2 | * | 7/2009 | Astruc | 701/3 |
| 2006/0111818 A1 | | 5/2006 | Ishii | |
| 2008/0051947 A1 | * | 2/2008 | Kemp | 701/3 |
| 2010/0194602 A1 | * | 8/2010 | Engels et al. | 340/979 |
| 2011/0001637 A1 | * | 1/2011 | Spiegel | 340/971 |
| 2011/0046818 A1 | * | 2/2011 | Herkes et al. | 701/3 |

FOREIGN PATENT DOCUMENTS

| | | |
|---|---|---|
| FR | 2868561 A1 | 10/2005 |
| FR | 2875901 A1 | 3/2006 |
| FR | 2906912 A1 | 4/2008 |
| JP | 9254897 A | 9/1997 |
| WO | 2008112530 A2 | 9/2008 |

OTHER PUBLICATIONS

Search Report and Written Opinion; Application No. FR 1101562; dated Dec. 30, 2011.

* cited by examiner

*Primary Examiner* — Helal A Algahaim
*Assistant Examiner* — Shardul Patel
(74) *Attorney, Agent, or Firm* — Brooks Kushman P.C.

(57) ABSTRACT

A device (10) for defining a flight path (2) enabling an aircraft (1) to reach a destination (B), said device (10) including a digital terrain model (21) and a display screen (30), and being provided with generator means (15) for generating a flight path (2) including at least one flight segment (3) associated with a flying altitude. The device (10) includes a digital noise database (20) having volumes that are to be avoided, said device (10) having a computer (11) with a main memory (13) containing instructions for displaying on said display screen (30) and as an overlay on a first representation (31) of said terrain as provided by said digital terrain model (21): a second representation (41) of said volumes to be avoided; and a flight path (2) that has been generated by using said generator means (15).

18 Claims, 2 Drawing Sheets

DEVICE AND A METHOD FOR CONSTRUCTING A FLIGHT PATH IN ORDER TO REACH A DESTINATION

CROSS REFERENCE TO RELATED APPLICATIONS

This application claims priority to French patent application FR 11 01562 filed on May 20, 2011, the disclosure of which is incorporated in its entirety by reference herein.

BACKGROUND OF THE INVENTION (1) Field of the Invention

The present invention relates to a device and a technical method for constructing a flight path in order to reach a destination.

The invention thus lies in the field of flight management and navigation systems for an aircraft, and more particularly for a helicopter, which field usually covers the functions of preparing a flight plan and of generating a flight path.

(2) Description of Related Art

It should be observed that the term "flight plan" is used to mean an ideal flight path that the aircraft ought to follow in order to reach its destination, passing via a plurality of waypoints. The flight path then comprises at least one segment joining together two successive waypoints.

Each segment is thus associated with a flying altitude and possibly also a speed of advance, a stage of flight, and a width for defining a flight corridor to be followed in order to go from one waypoint towards another waypoint.

It should be observed that document FR 2 875 901 proposes, in particular, overlaying at least one segment of a flight path on a map view, while also displaying a representation of geographical zones that might be dangerous for the aircraft.

Under such circumstances, it can be understood that the state of the art includes systems on board an aircraft or capable of being taken on board an aircraft that are suitable for constructing a safe flight path.

Nevertheless, such a system does not take the volume of noise emitted by an aircraft into consideration.

Nevertheless, this constraint is not negligible. More and more aircraft are flying close to built-up areas having high population densities and also to residential or tourist sites that are relatively less densely populated. Consequently, local authorities are tending to take legislative action to counter the noise nuisance caused by aircraft. Certain decisions thus seek to reduce air traffic around predetermined flights. A pilot who does not comply with the legislation may be called on to explain the reasons for infringing the regulations that are in place, and may possibly suffer sanctions.

It should be observed that the noise constraint is particularly applicable to rotorcraft since they fly at low altitude, whereas airplanes often fly at altitudes that are high enough to avoid significant and lasting noise nuisance on the ground being overflown.

Devices are thus known for use in real time in flight to assist a pilot in complying with legislation in terms of noise emission.

Thus, document FR 2 868 561 discloses a method and a device for minimizing the noise emitted during takeoff and landing of a rotorcraft.

Document WO 2008/112530 discloses a device acting on the power of an engine during takeoff in order to reduce the noise emitted by an airplane to the ground.

Document FR 2 906 912 proposes a method and a device for determining the level of sound nuisance outside an aircraft.

Document U.S. Pat. No. 7,383,104 suggests calculating the noise generated by an aircraft while taking environmental considerations into account.

Document US 2011/0001637 relates to a method of determining the noise level of a rotary wing aircraft. In that method, the torque of a power transmission device is used to determine the noise level.

Furthermore, documents US 2006/111818 and JP 9 254897 are also known.

Thus, the prior art describes firstly methods and devices for establishing a flight path and secondly methods and devices for informing a pilot in real time about the noise emitted by the aircraft or indeed for establishing reduced noise flight procedures, in particular on takeoff and landing.

Thereafter, in order to reach a destination, the pilot follows the various segments of the flight path and controls noise emission in order to attempt to comply with regulations in terms of noise nuisance.

It should also be recalled that piloting an airplane and more particularly a helicopter is an activity that is complicated.

A helicopter responds quickly and in lively manner to piloting orders given by the pilot using the flight controls, and the maneuverability of a helicopter is very high. Furthermore, piloting techniques vary depending on the stage of flight, these techniques being different for example between a stage of flight at low speed and a stage of cruising flight.

A helicopter thus requires a high level of attention from a pilot, since piloting requires accurate correcting actions to be taken without delay. The workload on an aircraft pilot, and more particularly on a helicopter pilot, is thus very large.

It can be understood that pilots and aircraft manufacturers are thus confronted with a technical problem that is particularly difficult to solve, namely that of reaching a destination while emitting only moderate noise over certain sites, i.e. noise below a threshold that generates a small or zero sound footprint on the ground. It is difficult for a pilot to divert attention from piloting proper in order to take into consideration information relating to the noise emitted by the aircraft.

Furthermore, it should be observed that during a flight, a pilot's freedom of action is sometimes limited, e.g. by the amount of fuel available. As a function of this amount and of the fuel consumption of the power plant, a pilot is sometimes not able, without endangering the mission of the flight, to fly around a site that is the subject of strict legislation concerning noise nuisance.

From an extreme point of view, real time management of noise by a pilot otherwise occupied with vital aircraft-control tasks can actually be dangerous, since the pilot may need to depart from a flight path in order to limit noise emission over a site, with that being done to the detriment of safety.

BRIEF SUMMARY OF THE INVENTION

An object of the present invention is thus to propose a device for defining a flight path and reaching a destination with an aircraft, while minimizing the noise nuisance generated by the aircraft, the device having minimal impact on a pilot's workload in flight.

According to the invention, a device for defining a flight path enabling an aircraft to reach a destination includes a digital terrain model and a display screen, and is provided with generator means for generating a flight path including at least one flight segment associated with a flying altitude. Reference may be made to the literature to obtain information about means for generating a safe flight path comprising at least one segment of a given corridor width.

The device is remarkable in particular in that it includes a digital noise database having volumes that are to be avoided where such a volume is a volume into which an aircraft must avoid penetrating in order to avoid generating undue noise on the ground at predetermined sites, the device also having a computer with a main memory containing instructions enabling the following to be displayed on the display screen as an overlay on a first representation of said terrain as provided by the digital terrain model:

a second representation of the volumes to be avoided; and a flight path that has been generated by using the generator means.

It should be observed that the term "volume to be avoided" is used to mean a volume in which the aircraft emits noise that generates a sound footprint on the ground that is contrary to the legislation in force or any other local restriction.

Under such circumstances, the device may be on board an aircraft and it may be operated by a pilot before starting a flight or during a flight.

For example, the pilot may use the generator means to construct a safe flight path, possibly in application of the teaching of document FR 2 875 901. The computer then displays a second representation of the volumes to be avoided in which the aircraft is required to generate a small or zero sound footprint on the ground. This second representation may be displayed three-dimensionally or two-dimensionally depending on the embodiment.

If the pilot finds that the safe flight path that has been generated is not compatible with legislation, the pilot is then in a position to change it.

The device is thus very useful since it enables the pilot to solve a difficult technical problem, namely that of reducing the sound footprint on the ground of the aircraft over certain geographical sites without increasing the pilot's workload. The display thus serves specifically to perform operations that a pilot is not available to perform, particularly while the pilot is flying an aircraft.

It can be understood that the display may be used before a flight and thus avoid overloading a pilot in flight. If the pilot needs to modify a flight path while already in flight, it is possible for the pilot temporarily to generate a new safe flight path with the help of the device of the invention, e.g. while hovering in a helicopter, prior to following the new flight path while devoting full attention to piloting as such.

It should be observed that the device may provide for displaying several representations of the terrain. For example, it is possible to superpose the flight path as generated and the second representation of the volumes to be avoided on a first chart that shows the names of the built-up areas being overflown, and/or on a second chart showing the ground relief being overflown.

Similarly, it is possible to superpose the generated flight path and the second representation of volumes to be avoided on a single chart showing multiple types of information, such as the names of the built-up areas being overflown and the ground relief being overflown, for example.

The device may also include one or more of the following characteristics.

For example, by executing instructions stored in its main memory, the computer may determine whether a segment is a risky segment passing through a volume to be avoided.

In a first embodiment, the device displays the safe flight path together with the various volumes to be avoided in a three-dimensional space.

In a second embodiment, the device displays the safe flight path together with the various volumes to be avoided in a two-dimensional space.

Under such circumstances, by executing the instructions with each flight segment being associated in particular with a flying altitude, the computer displays on the display screen a second representation in two dimensions of a section of the volumes to be avoided at the flying altitude.

The device then displays only the sections of volumes to be avoided that exist at the altitude at which the aircraft is flying. Consequently, when a segment overflies a given volume to be avoided, the computer does not display any information about this given volume to be avoided, like the method applied in document FR 2 875 901 for determining portions of ground relief that might be dangerous.

Consequently, the computer displays on the display screen those volumes to be avoided that are present at the altitude of the segments of the safe flight path that has been constructed. Depending on the interference that is observed, the operator may modify the safe flight path that has been constructed in order at least to limit such interference.

Furthermore, the device includes a flight instructions database, and by executing the stored instructions, the computer determines whether a segment of a generated flight path is a risky segment, i.e. passing through a volume to be avoided, and displays information relating to flight instructions to be applied while traveling along the risky segment.

When the aircraft takes off or lands in an area of high population density and thus associated with a volume to be avoided, the device displays a symbol on the risky area, referring to predetermined instructions for flying with moderate noise in order to limit the noise impact of the aircraft in a site that is protected by legislation. These flight instructions may include flight instructions proper or indeed flight procedures.

In another aspect, the device may include an aircraft database supplied by the manufacturer of an aircraft and characterizing the noise generated by the aircraft, and a legislative database containing the regulations to be complied with in terms of noise emissions. By executing the instructions stored in its main memory, the computer generates the noise database from the aircraft database and the legislative database.

For example, the legislative database provides the geographical coordinates of protected sites that are not to be subjected to noise nuisance. The aircraft database characterizes the noise emitted by a given aircraft, e.g. in the form of a sphere surrounding the aircraft. The computer deduces the noise database therefrom, with the various volumes to be avoided corresponding to portions of air space in which flying the aircraft gives rise to undue noise nuisance on the ground.

It can be understood that a manufacturer may develop an aircraft database for each version of the aircraft it manufactures.

Furthermore, the device may include a meteorological database. By executing the instructions stored in its main memory, the computer generates the noise database from the aircraft database together with the legislative database and the meteorological database.

The computer then determines the volumes to be avoided, e.g. by determining noise domes over protected sites stored in the legislative database, and it then deforms said domes in order to obtain the volumes to be avoided as a function of meteorological data such as wind speed and direction.

Furthermore, the device optionally includes a secondary memory, the generated flight path and the second representation of the volumes to be avoided being stored in the secondary memory.

It is possible that a pilot cannot avoid a volume to be avoided, e.g. because the aircraft does not have enough fuel to go around a given volume to be avoided.

Under such circumstances, the relevant authorities are likely to seek explanations from the pilot. The pilot may be able to resolve this difficult technical problem of justifying the flight path chosen specifically by providing the safe flight path as generated together with the reasons that constrained the pilot to avoid modifying the flight path.

In addition to a device, the invention also provides an aircraft including the device.

Similarly, the invention provides a method of defining a flight path in order to reach a destination using a flight path including at least one segment associated with a flying altitude, by using a digital terrain model and a display screen, together with generator means for generating the flight path.

This method is remarkable in particular in that:

a generated flight path is constructed during a flight path construction step by the generator means operated by an operator; and volumes to be avoided into which an aircraft should avoid penetrating in order to avoid generating undue noise on the ground at predetermined sites are displayed together with the generated flight path on a display screen, being overlaid on a first representation of a terrain during a comparison step implemented by a computer.

Optionally, an alternative flight path is constructed when the generated flight path and the locations of volumes to be avoided are incompatible.

An aircraft then reaches a destination by following the final flight path selected by the pilot, i.e. the flight path as generated initially or an alternative flight path.

The method may include one or more of the following alternative characteristics.

In a variant:

said generated flight path is constructed with the help of the generator means; and a computer provided with a main memory containing instructions executes the instructions to display volumes to be avoided and the generated flight path on the display screen as an overlay on a first representation of a terrain as provided by a digital terrain model, the computer making use of a digital noise database including the volumes to be avoided into which an aircraft should avoid penetrating so as to avoid generating undue noise on the ground at predetermined sites in order to determine and display said volumes to be avoided on the first terrain representation.

In another aspect, for a segment associated in particular with a flying altitude, a second representation in two dimensions of a section of the volumes to be avoided at said flying altitude is displayed on said display screen, by means of a computer executing stored instructions.

Furthermore, information relating to flight instructions for application while following a risky segment is displayed on said display screen, the information relating to flight instructions being extracted from a flight instructions database, by means of a computer executing stored instructions.

Furthermore, the noise database may be a database that has been predefined by the manufacturer.

In a variant, said noise database is generated from an aircraft database characterizing the noise generated by an aircraft, and from a legislative database containing the regulations to be complied with in terms of noise emission, by means of a computer executing stored instructions.

In another variant, said noise database is generated from an aircraft database characterizing the noise generated by an aircraft, from a legislative database containing the regulations to be complied with in terms of noise emissions, and also from a meteorological database, by means of a computer executing stored instructions. It can be understood that the meteorological database includes information relating to the weather at the time of the forthcoming flight.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are shown in more than one of the figures are given the same references in each of them.

DETAILED DESCRIPTION OF THE INVENTION

Figure 1:
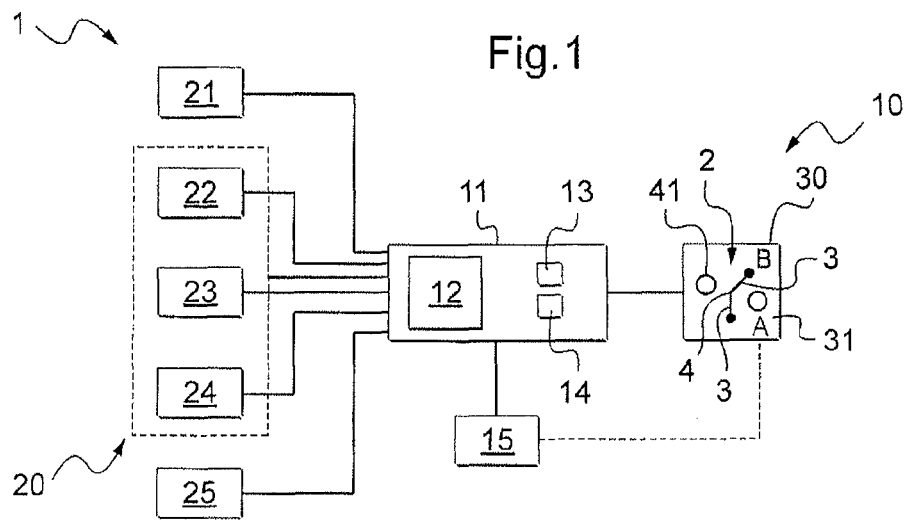
FIG. 1 is a diagram of a device of the invention.

FIG. 1 shows a device 10 for defining a flight path 2 enabling a destination B to be reached starting from a starting point A. The device 10 may be installed permanently in an aircraft 1 or it may be movable so as to be placed on board such an aircraft 1 temporarily. It can be understood that the device 10 may be a portable computer or the equivalent, e.g. a touch pad.

The aircraft 1 is not shown overall in order to avoid overloading FIG. 1 pointlessly.

The device 10 has a display screen 30 and generator means 15 for generating a flight path. In flight or on the ground, an operator then positions a plurality of waypoints 4 to construct a flight path going from the starting point A to the destination B, the flight path including at least one segment 3 between two waypoints.

Each segment 3 is associated with a corridor within which the aircraft 1 may travel, and also with a flight altitude and possibly a flight stage. A segment may be associated with a constant altitude, or with a varying altitude.

Reference may be made to the literature to obtain additional information about the means for generating a segmented flight path.

Advantageously, but not necessarily, the generator means 15 are connected to a computer 11 of the device 10.

The computer has a processor 12 together with main memory 13 and possibly also secondary memory 14. It will be understood that the main memory 13 and the secondary memory 14 may be constituted by a single memory.

The main memory 13 then contains instructions that can be executed by the processor 12, with the secondary memory 14 acting as a storage unit.

The processor 12 executes the instructions from the main memory 13 in order to display on the screen and in overlay relative to a first representation 31 of a terrain:

second representations 41 of volumes to be avoided; and the flight path 2.

Consequently, the computer co-operates at least with a digital database including a digital terrain model 21, and also with a noise database 20, or indeed a flight instructions database 25 stored in one or more memories of the device 10.

The digital terrain model 21 provides the computer with data relating to the terrain that is to be overflown by the aircraft in order to reach its destination.

Furthermore, the flight instructions database 25 provides the computer with data relating to flight procedures in predetermined situations.

Finally, the noise database 20 provides the computer 11 with data relating to the locations and shapes of volumes to be avoided. Each volume to be avoided represents a portion of air space into which an aircraft should normally not penetrate, for the purpose of avoiding generating excessive noise on the ground at sites that are predetermined by legislation.

It should be observed that the computer may establish this noise database 20 from an aircraft database 22 and a legislative database 23.

For example, the legislative database 23 includes the coordinates of protected sites that are not to be subjected to noise nuisance.

Furthermore, the aircraft database 22 characterizes the noise emitted by an aircraft. For example, this database certifies that an aircraft flying at a given height generates undue noise in a volume defined by a sphere of given radius.

The processor 12 then executes instructions stored in the main memory 13 so as to combine the information of the aircraft database 22 and of the legislative database 23 in order to determine the locations and the shapes of volumes to be avoided which the aircraft must avoid in order to comply with the legislation.

For example, each volume to be avoided may be a volume in the form of a hemisphere centered on each of said protected sites.

It should be observed that the legislative database 23 may ban overflight of a site. This no-fly air space is then represented by a volume that extends upwards from the ground over a height that is greater than the maximum flying altitude of the aircraft, or else over a height that is "infinite", in the form of a cylinder, for example.

Nevertheless, the computer 11 may also use a meteorological database 24 in order to take meteorological characteristics into consideration when generating the volumes to be avoided.

For example, as a function of the expected wind speed and direction during the flight, the computer 11 adapts the shapes of the volumes to be avoided on the basis of the aircraft database 22 and the legislative database 23.

In the method implemented by the device 10, whether on the ground or in flight during a stage of flight that does not necessarily require the full attention of a pilot, a flight path for reaching a destination B is generated during a path-building step by an operator using the generator means.

During a comparison step, the volumes to be avoided are determined. The display screen displaying a first representation 31 of a digital terrain model has overlaid thereon firstly the flight path 2 as generated and secondly a second representation 41 of the volumes to be avoided 40.

For example, this comparison step is implemented by the computer 11 on an order from the operator, the processor 12 applying instructions from the main memory 13 in order to obtain the required display.

Figure 2:
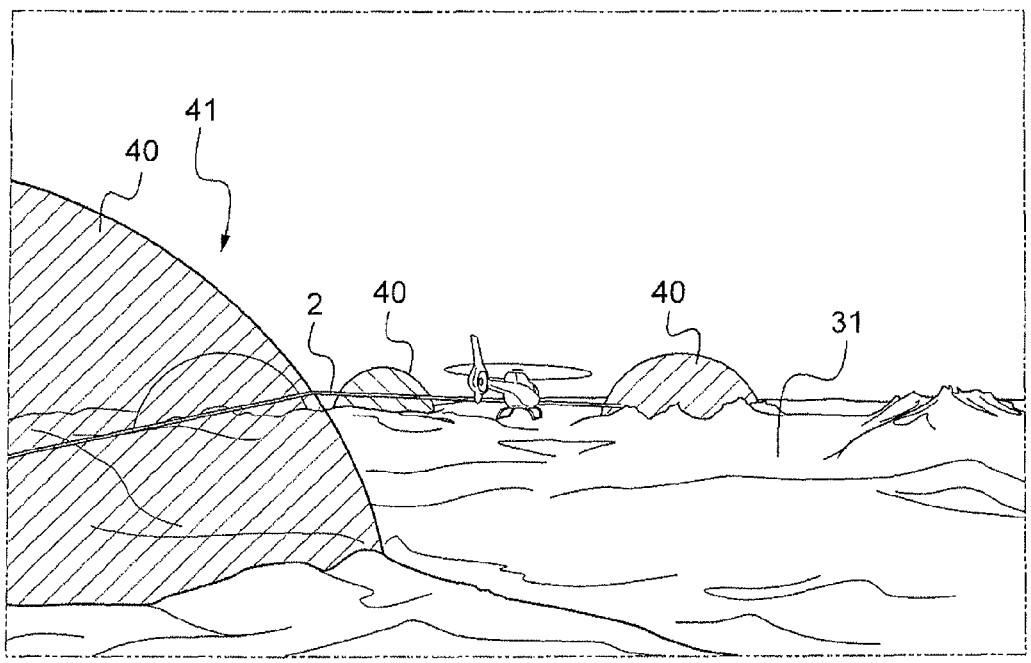
FIG. 2 shows a three-dimensional display of a flight path and of volumes to be avoided.

With reference to FIG. 2, in a first embodiment, the computer causes the first representation 31 and the second representation 41 to be displayed in three dimensions. FIG. 2 shows in particular various volumes to be avoided 40 that are in the form of domes.

Figure 3:
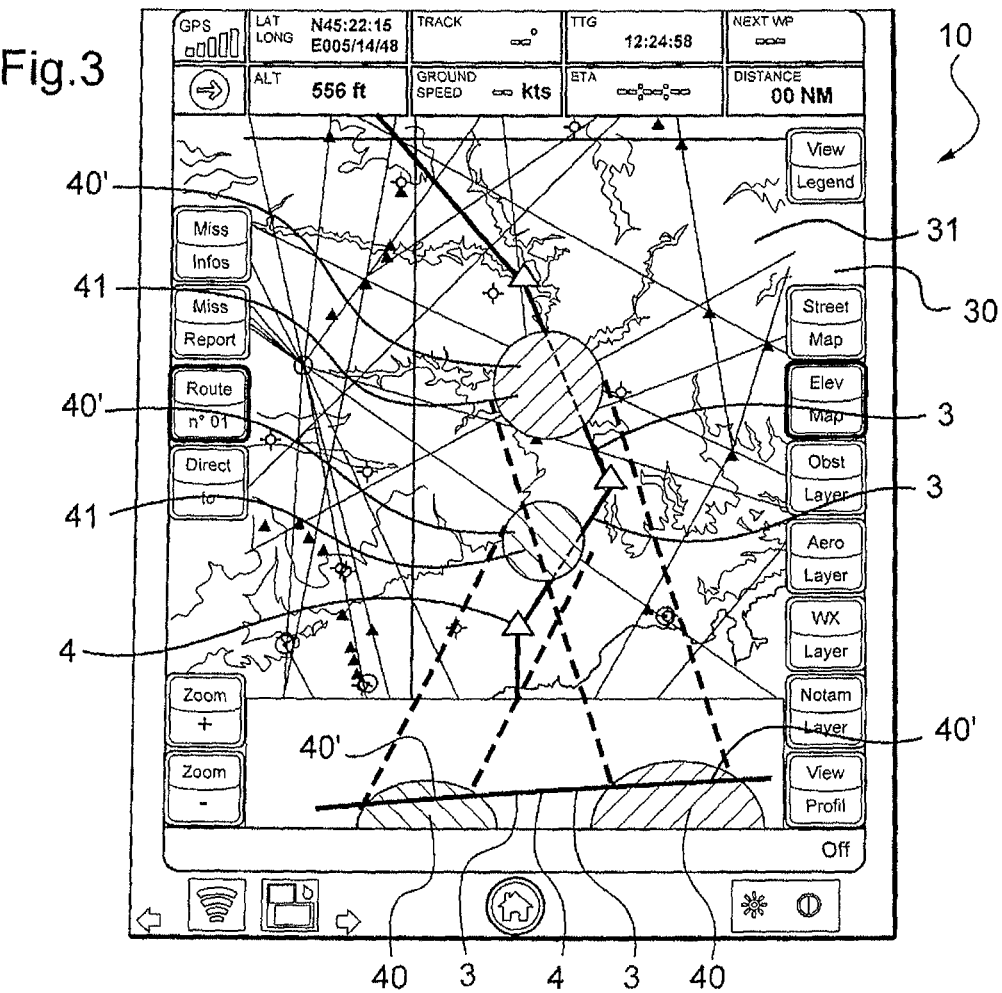
FIG. 3 shows a two-dimensional display of a flight path and of volumes to be avoided.

With reference to FIG. 3, in a second embodiment, the computer causes the first representation 31 and the second representation 41 to be displayed in two dimensions.

Each segment 3 uniting two waypoints 4 is associated with a flight altitude so it is possible to display no more than a representation of the section 40' of the volumes to be avoided that are to be found at the flying altitude of the aircraft, i.e. at the altitude of at least one segment 3 of the flight path 2.

More particularly, it is possible to limit the display to those sections 40' through which a segment 3 passes that is referred to for convenience as a "risky segment", like the example shown in FIG. 3.

Under such circumstances, the computer 11 causes the second representation 41 of said sections 40' to be displayed in a two-dimensional space.

Figure 5:
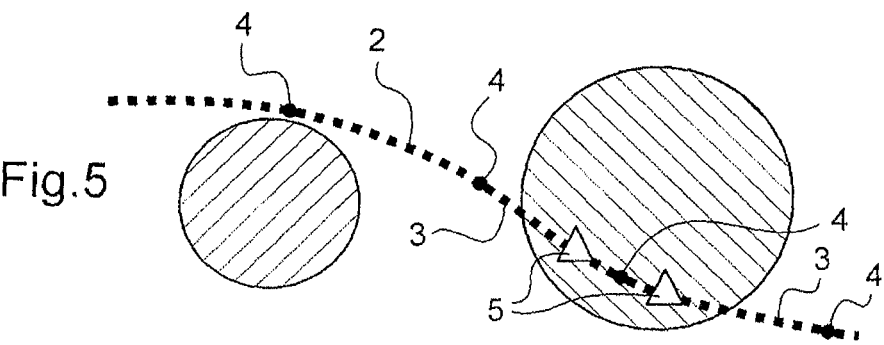

Furthermore, with reference to FIG. 5, if a segment of the flight path 2 is a risky segment passing through a volume that is to be avoided, information 5 relating to flight instructions for application when following a risky segment is displayed on the display screen 30. This information may be a symbol indicating the need to apply a special flight procedure while traveling along this segment 3.

Figure 4:
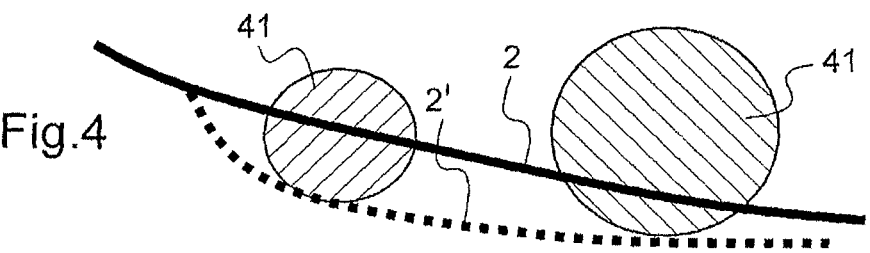
FIGS. 4 and 5 are diagrams explaining the invention.

With reference to FIG. 4, an operator may also generate an alternative flight path 2' when the flight path 2 that has already been generated and the locations of volumes to be avoided 40 are incompatible.

Furthermore, with reference to FIG. 1, the device 10 may include a secondary memory 14 such as a memory of the computer 11, for storing routes that have been generated by using the device, together with the associated volumes that are to be avoided. For example, the computer may store a flight path together with the first representation of the terrain having the second representation 41 of the volumes to be avoided 40 displayed as an overlay thereon.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A device for defining a flight path enabling an aircraft to reach a destination, said device comprising:
   a digital terrain model;
   a digital noise database having volumes to be avoided, each volume to be avoided being a zone in which an aircraft emits noise generating a sound footprint above a predetermined threshold value on the ground at predetermined sites;
   an aircraft database supplied by the manufacturer of an aircraft and characterizing the noise generated by said aircraft;
   a legislative database containing the regulations to be complied with in terms of noise emissions;
   a display screen;
   generator means for generating a flight path including at least one flight segment associated with a flying altitude; and
   a computer with a main memory containing instructions enabling the following to be displayed on said display screen as an overlay on a first representation of said terrain as provided by said digital terrain model: a second representation of said volumes to be avoided; and a flight path that has been generated by using said generator means;
   wherein by executing said instructions said computer generates said noise database from said aircraft database and said legislative database.

2. A device according to claim 1, wherein by executing said instructions said computer determines whether a segment is a risky segment passing through a volume to be avoided defined by the digital noise database.

3. A device according to claim 2, wherein by executing said instructions with each flight segment being associated with a flying altitude, said computer displays on said display screen a section of said volumes to be avoided at said flying altitude in two dimensions as the second representation.

4. A device according to claim 3, wherein said device includes a flight instructions database, and by executing said instructions, said computer determines whether a segment of a generated flight path is a risky segment passing through a volume to be avoided from the digital noise database, and displays information on the display relating to flight instructions to be applied while traveling along said risky segment through the volume to be avoided.

5. A device according to claim 1 further comprising a meteorological database; and
wherein by executing said instructions said computer generates said noise database from said aircraft database together with said legislative database and said meteorological database.

6. A device according to claim 1 further comprising a secondary memory, said generated flight path and said second representation of said volumes to be avoided being stored in said secondary memory.

7. An aircraft, including a device according to claim 1.

8. A method of defining a flight path in order to reach a destination, the flight path including at least one segment associated with a flying altitude, by using a digital terrain model, a digital noise database, and a display screen, together with generator means for generating said flight path, the method comprising:
generating said noise database from an aircraft database characterizing the noise generated by an aircraft, and from a legislative database containing the regulations to be complied with in terms of noise emission;
constructing a generated flight path during a flight path construction step using the terrain model and the noise database;
displaying terrain as a first representation on a display screen; and
overlaying volumes to be avoided from the noise database into which an aircraft should avoid penetrating in order to avoid generating undue noise on the ground at predetermined sites, and the generated flight path on the display screen over the first representation of the terrain during a comparison step.

9. A method according to claim 8 further comprising constructing an alternative flight path when the generated flight path and the locations of volumes to be avoided are incompatible.

10. A method according to claim 8, wherein said generated flight path is constructed with the help of the generator means; and the method further comprising:
executing said instructions to display volumes to be avoided and said generated flight path on said display screen as an overlay on a first representation of a terrain as provided by a digital terrain model using a computer provided with a main memory, said computer making use of the digital noise database including the volumes to be avoided in order to display said volumes to be avoided on said representation.

11. A method according to claim 8, further comprising displaying a second representation in two dimensions of a section of said volumes to be avoided at said flying altitude for a segment associated with a flying altitude on said display screen by a computer.

12. A method according to claim 11, further comprising displaying information relating to flight instructions for application while following a risky segment entering one of the volumes to be avoided from the digital noise database on said display screen, said information relating to flight instructions being extracted from a flight instructions database regarding flight procedures within the one of the volumes to be avoided.

13. A method according to claim 8, further comprising generating said noise database from an aircraft database characterizing the noise generated by an aircraft, from a legislative database containing the regulations to be complied with in terms of noise emissions, and also from a meteorological database.

14. A device according to claim 1, wherein the flight path generated by the generated means is based on the volumes to be avoided from the digital noise database and the digital terrain model.

15. A device for defining a flight path for an aircraft, the device comprising:
a display screen;
a computer linked to a terrain model and a noise database, the noise database containing data relating to the locations and shapes of volumes to be avoided by the aircraft, where each volume to be avoided represents a portion of air space to avoid to reduce excessive noise at predetermined sites on the ground, the computer configured to generate the noise database using an aircraft database characterizing the noise generated by said aircraft, a legislative database containing the regulations to be complied with in terms of noise emissions, and a meteorological database; and
a flight path generator configured to generate a flight path to a destination, the flight path containing at least one segment with an associated flight altitude;
wherein the computer is configured to command the display screen to display: (i) a first representation of the terrain model, (ii) a second representation of volumes to be avoided overlaying first representation, and (iii) the flight path overlaying the first representation.

16. The device of claim 15 wherein the first representation, second representation, and flight path are displayed on the display screen as a three dimensional view.

17. The device of claim 15 wherein the first representation, second representation, and flight path are displayed on the display screen as a navigational chart.

18. The device of claim 15 further comprising a flight instructions database linked to the computer, the flight instructions database having predetermined instructions for flying with moderate noise to limit the noise impact of the aircraft at a predetermined site, the predetermined instructions including at least one of flight instructions proper and flight procedures;
wherein the computer is configured to designate a segment of a generated flight path passing through a volume to be avoided as a risky segment;
wherein the computer is configured to display a symbol on the display screen indicating flight instructions to be applied when the aircraft is traveling along the risky segment.

* * * * *